United States Patent [19]
Strawn

[11] Patent Number: 5,663,708
[45] Date of Patent: Sep. 2, 1997

[54] U-TURN SIGNAL APPARATUS

[76] Inventor: Dennis M. Strawn, 11 Gray Stone Way, Laguna Niguel, Calif. 92677

[21] Appl. No.: 625,246

[22] Filed: Apr. 1, 1996

[51] Int. Cl.⁶ .................................................. B60Q 1/34
[52] U.S. Cl. .................... 340/465; 340/461; 340/472; 340/475
[58] Field of Search .................... 340/463, 465, 340/475, 468, 464, 471, 472, 461

[56] References Cited

U.S. PATENT DOCUMENTS

| | | | |
|---|---|---|---|
| 2,453,421 | 11/1948 | Dyer | 340/475 |
| 3,252,136 | 5/1966 | Bartens | 340/475 |
| 4,387,361 | 6/1983 | Reed | 340/475 |
| 4,868,541 | 9/1989 | Sullivan et al. | 340/465 |
| 4,987,404 | 1/1991 | Gerosa et al. | 340/461 |
| 4,994,786 | 2/1991 | Schaffer | 340/465 |
| 5,003,289 | 3/1991 | Roman | 340/475 |
| 5,086,289 | 2/1992 | Sullivan et al. | 340/475 |
| 5,281,950 | 1/1994 | Le | 340/475 |

*Primary Examiner*—Jeffery Hofsass
*Assistant Examiner*—Daniel J. Wu

[57] ABSTRACT

A U-turn signal apparatus including a vehicle with a front end and a rear end having two colored lights. The colored lights include a front left light situated on the front end at a left extent thereof and a rear left light situated on the rear end at a left extent thereof. The front left light is positioned adjacent to a conventional turn signal light. The rear left light is positioned adjacent to a conventional reverse light. Finally, control circuitry is situated within the vehicle and electrically connected to the front left light and rear left light. The control circuitry is adapted to actuate the front left light and the rear left light at the discretion of a user.

1 Claim, 3 Drawing Sheets

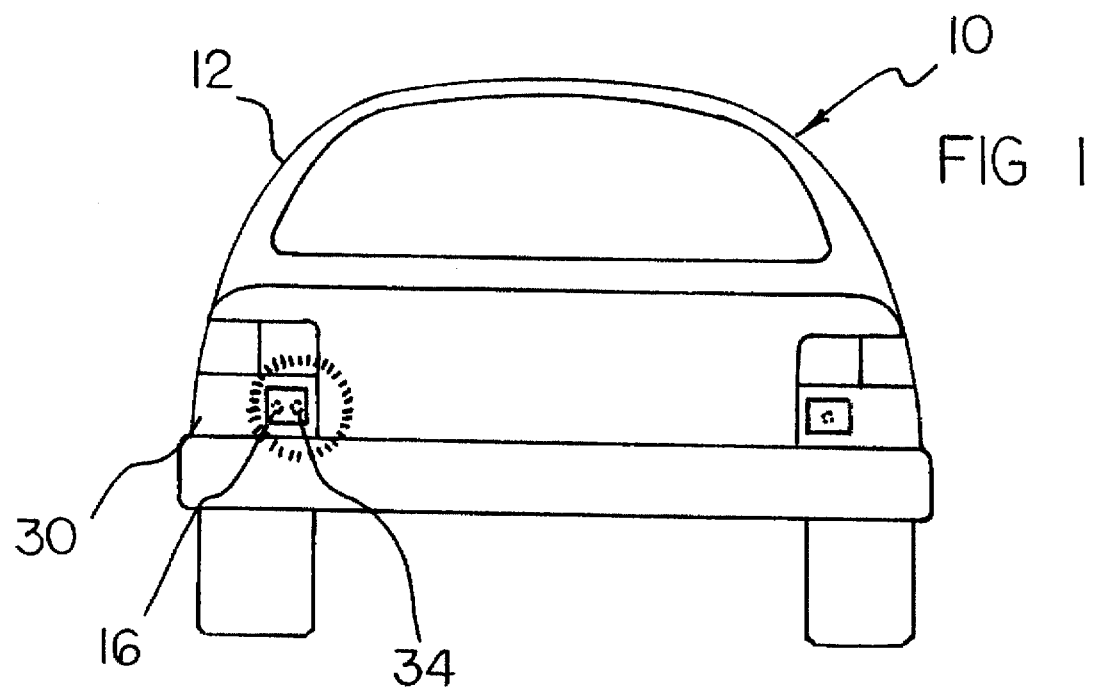
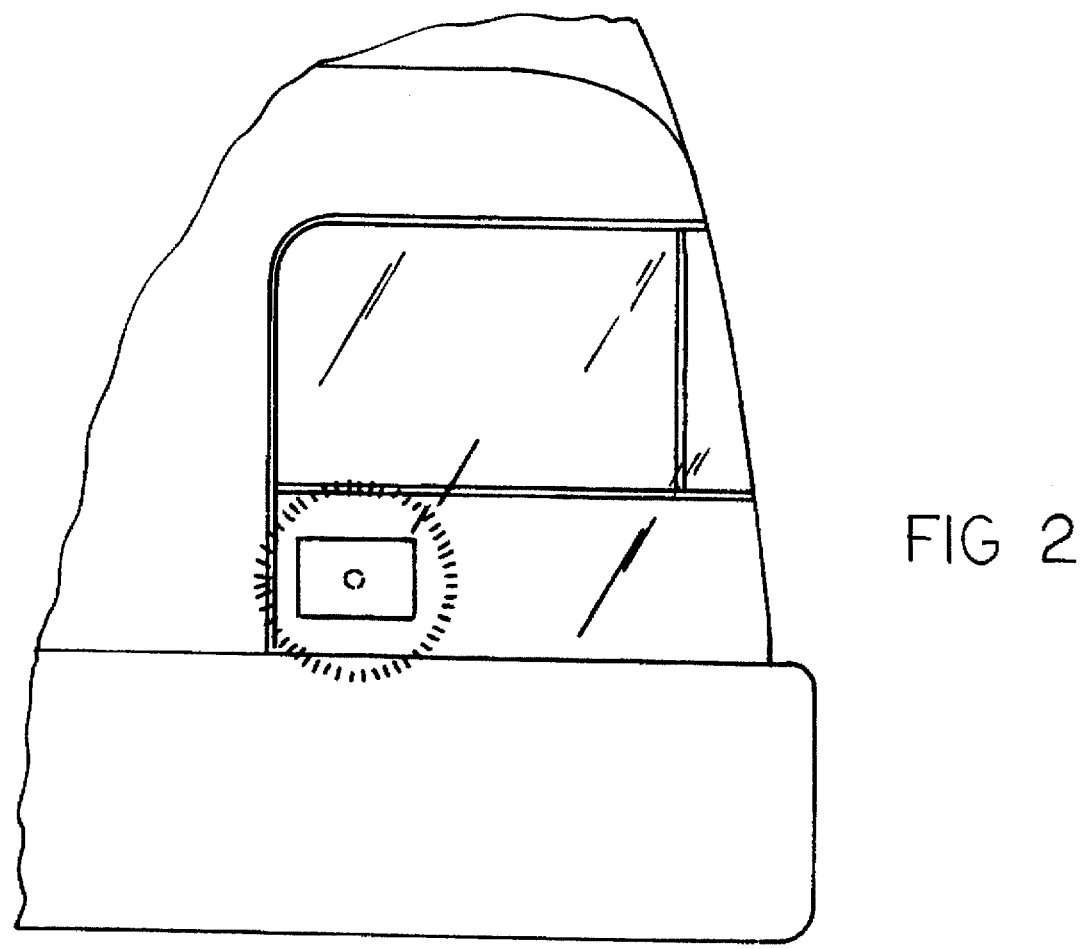

5,663,708

U-TURN SIGNAL APPARATUS

BACKGROUND OF THE INVENTION

1. Field of the Invention

The present invention relates to a U-turn signal apparatus and more particularly pertains to allowing a user to conveniently signal a U-turn to drivers both to the front and rear of the vehicle while preserving the aesthetic appearance of the vehicle.

2. Description of the Prior Art

The use of signal devices is known in the prior art. More specifically, signal devices heretofore devised and utilized for the purpose of signalling U-turns are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,994,786 to Schaffer a U-turn signal for vehicles including a plurality of lights forming an inverted "U". U.S. Pat. No. 5,003,289 to Roman discloses a U-turn signal attachment to be mounted on the lower left corner of a rear window structure. U.S. Pat. No. Des. 296,368 to Fowler discloses the ornamental design for a U-turn signalling device. U.S. Pat. No. 5,086,289 to Sullivan et al.; U.S. Pat. No. 4,868,541 to Sullivan et al.; and U.S. Pat. No. 4,387,361 to Reed are provided as being of general interest.

In this respect, the U-turn signal apparatus according to the present invention substantially departs from the conventional concepts and designs of the prior art, and in so doing provides an apparatus primarily developed for the purpose of allowing a user to conveniently signal a U-turn to drivers both to the front and rear of the vehicle while preserving the aesthetic appearance of the vehicle.

Therefore, it can be appreciated that there exists a continuing need for a new and improved U-turn signal apparatus which can be used for allowing a user to conveniently signal a U-turn to drivers both to the front and rear of the vehicle while preserving the aesthetic appearance of the vehicle. In this regard, the present invention substantially fulfills this need.

SUMMARY OF THE INVENTION

In view of the foregoing disadvantages inherent in the known types of signal devices now present in the prior art, the present invention provides an improved U-turn signal apparatus. As such, the general purpose of the present invention, which will be described subsequently in greater detail, is to provide a new and improved U-turn signal apparatus which has all the advantages of the prior art and none of the disadvantages.

To attain this, the present invention essentially comprises a vehicle with a front end and a rear end. Also included are two green lights comprising a front left light situated on the front end at a left extent thereof and a rear left light situated on the rear end at a left extent thereof. The front left light is situated within a conventional turn signal indicator housing with a clear translucent cover such that the front left light is positioned adjacent to a conventional turn signal light located therein. The rear left light is situated within a conventional reverse indicator housing with a clear translucent cover and is further positioned adjacent to a conventional reverse light located therein. Also included is control circuitry located within the vehicle and electrically connected to the front left light, rear left light, and a plurality of conventional turn signals lights. Such turn signal lights include a front left turn signal, a rear left turn signal, a front right turn signal, and a rear right turn signal. The control circuitry is adapted to intermittently actuate a first combination of lights including the front left turn signal and the rear left turn signal upon the activation thereof in a first mode operation. A second combination of turn signals including the front right turn signal and the rear right turn signal are intermittently actuated upon the activation of the control circuitry in a second mode of operation. The control circuitry is further adapted to actuate the front left light and the rear left light intermittently upon the actuation thereof in a third mode of operation. Lastly, the control circuitry is adapted to preclude the activation of the conventional turn signals, front left light, and rear left light in a fourth mode of operation. Finally, a quintuple throw control switch with an associated lever is positioned within the vehicle adjacent to a steering column thereof. Such switch is electrically connected to the control circuitry. The control switch is adapted to actuate the control circuitry in a first mode of operation when in a first orientation thereof for signalling a left turn to other drivers and actuate the control circuitry in a second mode of operation when in a second orientation thereof for signalling a right turn to other drivers. For signalling a U-turn to other drivers, the switch actuates the control circuitry in a third mode of operation when in a third orientation thereof. Lastly, the control circuitry is actuated in a fourth mode of operation in a final orientation of the switch for disabling all of the lights.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved U-turn signal apparatus which has all the advantages of the prior art signal devices and none of the disadvantages.

It is another object of the present invention to provide a new and improved U-turn signal apparatus which may be easily and efficiently manufactured and marketed.

It is a further object of the present invention to provide a new and improved U-turn signal apparatus which is of a durable and reliable construction.

An even further object of the present invention is to provide a new and improved U-turn signal apparatus which is susceptible of a low cost of manufacture with regard to both materials and labor, and which accordingly is then susceptible of low prices of sale to the consuming public, thereby making such U-turn signal apparatus economically available to the buying public.

Still yet another object of the present invention is to provide a new and improved U-turn signal apparatus which provides in the apparatuses and methods of the prior art some of the advantages thereof, while simultaneously overcoming some of the disadvantages normally associated therewith.

Still another object of the present invention is to allow a user to conveniently signal a U-turn to drivers both to the front and rear of the vehicle while preserving the aesthetic appearance of the vehicle.

Lastly, it is an object of the present invention to provide a new and improved U-turn signal apparatus including a vehicle with a front end and a rear end having two colored lights. The colored lights include a front left light situated on the front end at a left extent thereof and a rear left light situated on the rear end at a left extent thereof. The front left light is positioned adjacent to a conventional turn signal light. The rear left light is positioned adjacent to a conventional reverse light. Finally, control circuitry is situated within the vehicle and electrically connected to the front left light and rear left light. The control circuitry is adapted to actuate the front left light and the rear left light at the discretion of a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an illustration of the preferred embodiment of the U-turn signal apparatus constructed in accordance with the principles of the present invention.

FIG. 2 is a cut-away view of a turn signal light without a U-turn signal light.

Similar reference characters refer to similar parts throughout the several views of the drawings.

DESCRIPTION OF THE PREFERRED EMBODIMENT

Figure 3:
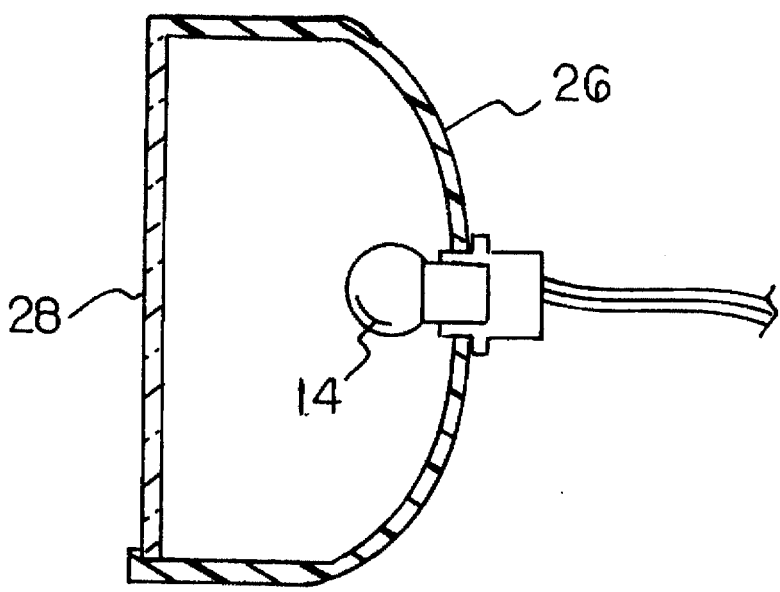
FIG. 3 is a cross-sectional view of the front parking light housing in which a U-turn bulb is situated.

With reference now to the drawings, and in particular to FIG. 1 thereof, a new and improved U-turn signal apparatus embodying the principles and concepts of the present invention and generally designated by the reference numeral 10 will be described.

The present invention, the new and improved U-turn signal apparatus, is comprised of a plurality of components. Such components in their broadest context include U-turn lights, turn signals, control circuity, and a control switch. Such components are individually configured and correlated with respect to each other so as to attain the desired objective.

More specifically, it will be noted that the system 10 of the present invention includes a vehicle 12 with a front end and a rear end each having a light with a green tint formed thereon for producing a green light upon the activation thereof. It should be noted that a green cover with a clear bulb would effect similar results. The green lights include a front left light 14 situated on the front end at a left extent thereof and a rear left light 16 situated on the rear end at a left extent thereof. As shown in FIG. 3, the front left light 14 is situated within a conventional turn signal indicator housing 26 with a clear translucent cover 28. The front left light is positioned adjacent to a conventional turn signal light located therein. Alternatively, the front left light may be positioned in the same compartment as a parking signal. Also, if both the parking light and the turn signal fail to include a clear cover, the front left light may be located in a separate compartment with a clear translucent cover. The rear left light is situated within a conventional reverse indicator housing 30 with a clear translucent cover and is further positioned adjacent to a conventional reverse light 34 located therein. The clear translucent covers are frosted in order to ensure that the green bulbs cannot be seen when not actuated. It should also be noted that a different color may be employed in lieu of green as long as the color is not currently used on the vehicle for signaling purposes.

Figure 4:
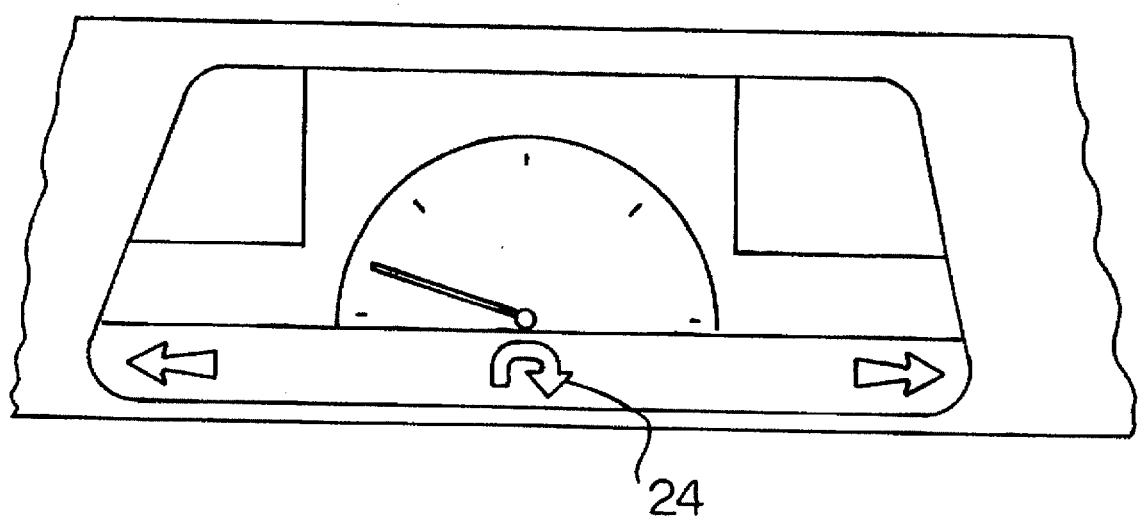
FIG. 4 is a front plan view of the control panel and associated turn signal icon.

Also included is control circuitry 36 situated within the vehicle and electrically connected to the front left light, rear left light, and a plurality of conventional turn signals lights 22. Such turn signal lights include a front left turn signal, a rear left turn signal, a front right turn signal, and a rear right turn signal. The control circuitry is adapted to intermittently actuate a first combination of lights including the front left turn signal and the rear left turn signal upon the activation thereof in a first mode operation. A second combination of turn signals including the front right turn signal and the rear right turn signal are intermittently actuated upon the activation of the control circuitry in a second mode of operation. The control circuitry is further adapted to actuate the front left light and the rear left light intermittently upon the actuation thereof in a third mode of operation. Lastly, the control circuitry is adapted to preclude the activation of the conventional turn signals, front left light, and rear left light in a fourth mode of operation. As shown in FIG. 4, an interior U-turn indicator icon 24 is centrally situated on a control panel of the vehicle. Such interior U-turn indicator is adapted to intermittently actuate upon the activation of the control circuitry in a third mode of operation.

Finally, a quintuple throw control switch 38 with an associated lever 39 is positioned within the vehicle adjacent to a steering column thereof. Such switch is electrically connected between the lights and the control circuitry. The control switch is adapted to actuate the control circuitry in a first mode of operation when in a first orientation thereof for signalling a left turn to other drivers and actuate the control circuitry in a second mode of operation when in a second orientation thereof for signalling a right turn to other drivers. For signalling a U-turn to other drivers, the switch actuates the control circuitry in a third mode of operation when in a third and fourth orientation thereof. Lastly, the control circuitry is actuated in a fourth mode of operation when the control switch is in a fifth orientation thereof for disabling all of the lights.

Figure 5:
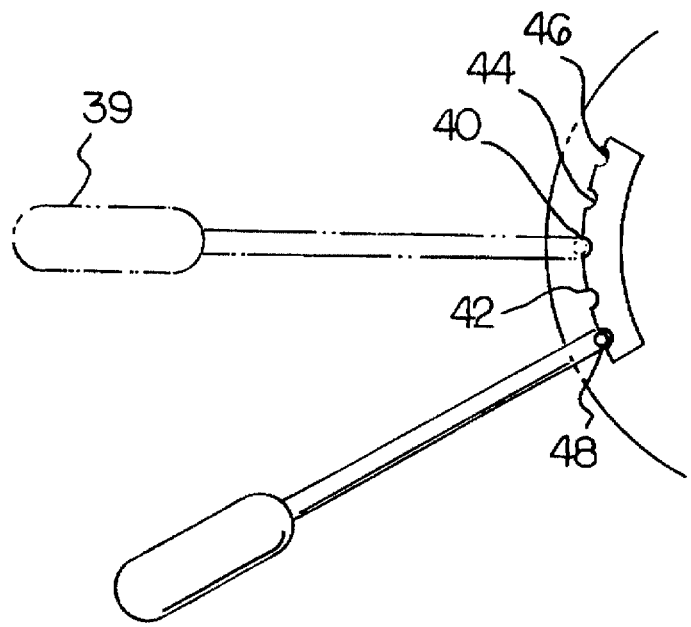
FIG. 5 is a plan view of the lever of the control switch.
Figure 6:
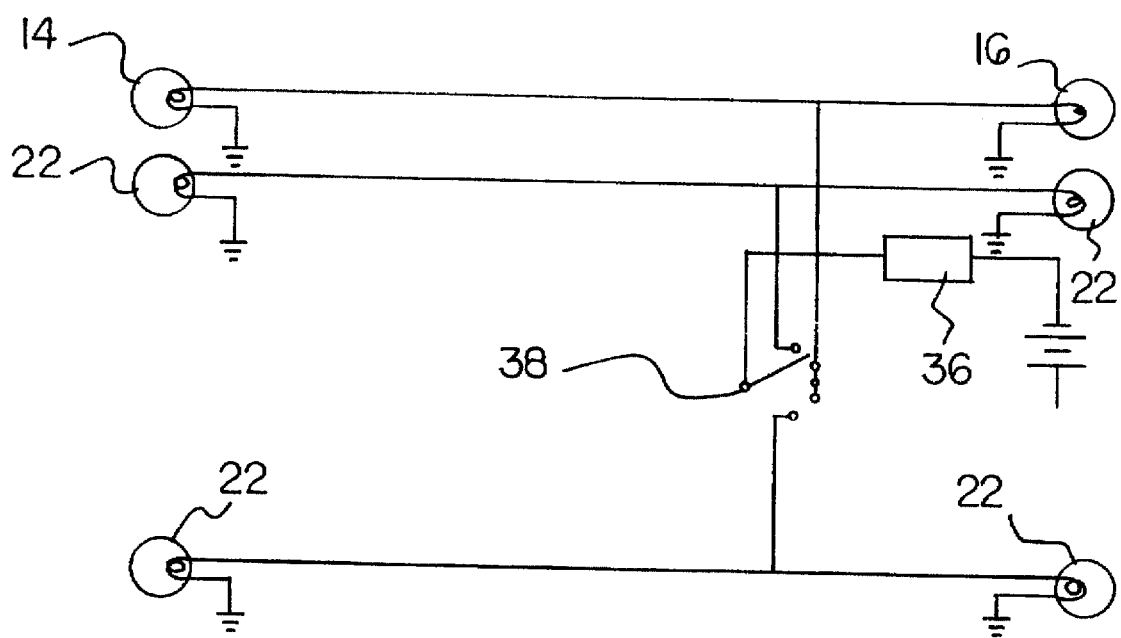
FIG. 6 is a schematic depicting the interconnection of electrical components employed in the present invention.

With reference to FIG. 5, the lever of the switch has five orientations consisting of vertically aligned notches. When a user wants to employ the control circuitry in a fourth mode of operation, the lever of the switch is shifted to a center notch 40. To signal a left and right turn, the lever is shifted to a lower notch 42 adjacent to the center notch and upper notch 44 also adjacent to the center notch, respectively. Finally, when the user wishes to signal a U-turn, the lever is positioned in an uppermost notch 46 adjacent to the right turn notch or a lowermost notch 48 adjacent to the left turn notch. In an alternate embodiment, solely a lowermost notch may be employed to effect signalling of a U-turn. The control switch and associated lever are further adapted to accommodate any other standard vehicular functions such as switching the headlights of the vehicle from a normal intensity to a bright intensity and visa-versa.

The present invention affords a unique method of signalling to another driver that a U-turn is soon to be performed while preserving the aesthetic appearance of the vehicle. The U-turn signal apparatus accomplishes such by discreetly positioning a specially colored bulb within currently employed signal compartments of a vehicle. Such a device aids in preventing accidents such as rear collisions and accidents associated with right-on-red turns.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved U-turn signal apparatus comprising, in combination:

a vehicle with a front end and a rear end having two green lights including a front left light situated on the front end at a left extent thereof and a rear left light situated on the rear end at a left extent thereof, the front left light situated within a conventional turn signal indicator housing with a clear frosted translucent cover and positioned adjacent to a conventional turn signal light located therein, the rear left light situated within a conventional reverse indicator housing with a clear frosted translucent cover and further positioned adjacent to a conventional reverse light located therein;

control circuitry situated within the vehicle and electrically connected to the front left light, rear left light, and a plurality of conventional turn signals lights including a front left turn signal, a rear left turn signal, a front right turn signal, and a rear right turn signal, the control circuitry adapted to intermittently actuate a first combination of lights including the front left turn signal and the rear left turn signal upon the activation thereof in a first mode operation and a second combination of turn signals including the front right turn signal and the rear right turn signal upon the activation thereof in a second mode of operation, the control circuitry further adapted to actuate the front left light and the rear left light intermittently upon the actuation thereof in a third mode of operation and further preclude the activation of the conventional turn signals, front left light, and rear left light in a fourth mode of operation;

an interior U-turn indicator icon centrally situated on a control panel of the vehicle and adapted to intermittently actuate upon the activation of the control circuitry in a third mode of operation; and a throw control switch with an associated lever positioned within the vehicle adjacent to a steering column thereof and further electrically connected to the control circuitry, the control switch adapted to actuate the control circuitry in a first mode of operation when in a first orientation thereof for signalling a left turn to other drivers, actuate the control circuitry in a second mode of operation when in a second orientation thereof for signalling a right turn to other drivers, actuate the control circuitry in a third mode of operation when in a third orientation thereof for signalling a U-turn to other drivers, and actuate the control circuitry in a fourth mode of operation when in a final orientation thereof for disabling all of the lights, whereby the lever of the switch has five orientations consisting of vertically aligned notches with a center notch corresponding to the final orientation of the control switch, a lower notch situated adjacent to the center notch associated with the first orientation of the control switch for signalling a left turn to other drivers, an upper notch also situated adjacent to the center notch associated with the second orientation of the control switch for signalling a right turn to other drivers, an uppermost notch situated adjacent to the upper notch associated with the third orientation of the control switch for signalling a U-turn to other drivers, and a lowermost notch situated adjacent to the lower notch also associated with the third orientation of the control switch for signalling a U-turn to other drivers, wherein the control switch and associated lever are further adapted to accommodate other standard vehicular functions including the switching of headlights of the vehicle from a normal intensity to a bright intensity and visa-versa.

\* \* \* \* \*